US009169949B2

(12) United States Patent
Roth et al.

(10) Patent No.: US 9,169,949 B2
(45) Date of Patent: Oct. 27, 2015

(54) LOCK DOWN UNITS FOR LOADING ARMS AND LOADING ARMS COMPRISING THE SAME

(71) Applicant: OPW Engineered Systems, Inc., Lebanon, OH (US)

(72) Inventors: Joseph P. Roth, Lebanon, OH (US); Krzysztof Wejdman, Bibice (PL)

(73) Assignee: OPW Engineered Systems, Inc., Lebanon, OH (US)

( * ) Notice: Subject to any disclaimer, the term of this patent is extended or adjusted under 35 U.S.C. 154(b) by 62 days.

(21) Appl. No.: 13/974,922

(22) Filed: Aug. 23, 2013

(65) Prior Publication Data

US 2014/0060685 A1 Mar. 6, 2014

Related U.S. Application Data

(60) Provisional application No. 61/695,604, filed on Aug. 31, 2012.

(51) Int. Cl.
*F16L 3/20* (2006.01)
*F16L 3/202* (2006.01)
*F16L 43/02* (2006.01)

(52) U.S. Cl.
CPC . *F16L 3/20* (2013.01); *F16L 3/202* (2013.01); *F16L 43/02* (2013.01); *Y10T 137/8807* (2015.04)

(58) Field of Classification Search
CPC ........ B67D 9/02; F16L 27/0861; F16L 27/08; F16L 27/0804; F16L 27/0865; F16L 3/20; F16L 3/202; F16L 43/02; F16K 31/58; Y10T 137/6633; Y10T 137/8807
USPC .......... 137/615, 342; 141/279, 376, 387, 389, 141/388, 289; 441/5; 74/575–578
See application file for complete search history.

(56) References Cited

U.S. PATENT DOCUMENTS 889,677 A * 6/1908 Harris .......................... 74/577 S
1,496,096 A * 6/1924 Mullins .......................... 137/615
1,838,290 A * 12/1931 Steckel .......................... 137/615
2,492,049 A 12/1949 Krone et al.
2,598,133 A * 5/1952 Roesch .......................... 74/503
2,727,534 A 12/1955 Briede
2,739,778 A * 3/1956 Krone et al. .................. 137/615
2,781,052 A 2/1957 Schaetzly
2,953,161 A 9/1960 Muller
3,038,714 A * 6/1962 Klaus et al. ................... 267/154
3,086,552 A * 4/1963 Ragsdale ...................... 137/615
3,489,174 A 1/1970 Cooley, Jr.
3,651,832 A 3/1972 Meyer (Continued)

*Primary Examiner* — John K Fristoe, Jr.
*Assistant Examiner* — Craig J Price
(74) *Attorney, Agent, or Firm* — Dinsmore & Shohl LLP

(57) ABSTRACT

Lock down units and loading arms with lock down units are disclosed. According to one embodiment, a loading arm includes a product delivery pipe pivotally coupled to a product standpipe such that the product delivery pipe is rotatable in a vertical plane. A rocker assembly is coupled to the product delivery pipe. A support arm may be pivotally connected to the product standpipe and slidably coupled to the rocker assembly such that the support arm and the rocker assembly are slidable with respect to one another. The support arm comprises a plurality of slots. A locking pawl is affixed to the rocker assembly and selectively engagable with the slots such that, when the locking pawl is engaged with a slot of the support arm, the locking pawl couples the support arm to the rocker assembly, thereby preventing the product delivery pipe from being raised in the vertical plane.

24 Claims, 8 Drawing Sheets

100 104 112 124 118 126 110 130 136 136 128 140 120 122 102 138 134 119 132 106

(56) References Cited

U.S. PATENT DOCUMENTS 3,891,004 A 6/1975 Knight
4,537,233 A * 8/1985 Vroonland et al. ........... 141/387
4,883,229 A * 11/1989 Moeller ........................ 137/615
4,987,925 A 1/1991 Vroonland
5,479,776 A * 1/1996 Romano ...................... 74/502.2
5,983,936 A * 11/1999 Schwieterman et al. ..... 137/615
6,053,908 A * 4/2000 Crainich et al. ................ 74/575
2002/0020589 A1* 2/2002 Tagami et al. .................. 188/31

* cited by examiner 146
156
210
152
154
140
158
122

LOCK DOWN UNITS FOR LOADING ARMS AND LOADING ARMS COMPRISING THE SAME

CROSS REFERENCE TO RELATED APPLICATIONS

The present specification claims priority to U.S. Provisional Patent Application Ser. No. 61/695,604 filed Aug. 31, 2012 and entitled "Lock Down Units For Loading Arms And Loading Arms Comprising The Same," the entirety of which is incorporated herein by reference.

TECHNICAL FIELD

The present specification generally relates to loading arms used for the delivery of bulk products and, more specifically, to lock down units for loading arms and loading arms comprising the same.

BACKGROUND

Bulk products, such as liquid petroleum products, grains and the like, are generally transported with tanker trucks and/or tank rail cars. These bulk products are generally loaded into the tank of the truck or rail car with a loading arm which has one or more swivels to facilitate positioning the loading arm relative to a loading hatch of the truck and/or rail car. The swivels allow the outlet of the loading arm to be positioned relative to the loading hatch in at least a vertical plane.

The diameter of the loading arm is generally large to allow for a large volume of the bulk product to be rapidly loaded into the loading hatch of the truck or rail car. As the bulk product is loaded into the tank, the product may act as a "jet" which reacts against the loading arm. This causes the loading arm to swivel upwards, out of alignment with the loading hatch. This misalignment, combined with the large volume of bulk product being dispensed from the loading arm, may cause a significant spill condition. Such spills decrease the efficiency of the loading operation. Moreover, product lost due to this misalignment may be difficult to recover, particularly in the case of liquid bulk products. As such, misalignment of the loading arm with the loading hatch may also result in an increase in the cost of the bulk product.

Accordingly, a need exists for alternative mechanisms for preventing misalignment of a loading arm with a loading hatch during bulk product loading and loading arms comprising the same.

SUMMARY

In one embodiment, a loading arm may include a product delivery pipe pivotally coupled to a product standpipe such that the product delivery pipe is rotatable with respect to the product standpipe in at least a vertical plane. A rocker assembly may be coupled to the product delivery pipe. A support arm may be pivotally connected to the product standpipe and slidably coupled to the rocker assembly such that the support arm and the rocker assembly are slidable with respect to one another. The support arm may include a plurality of slots. A locking pawl may be affixed to the rocker assembly such that the locking pawl is selectively engagable with one of the plurality of slots in the support arm such that, when the locking pawl is engaged with a slot of the support arm, the locking pawl couples the support arm to the rocker assembly, thereby preventing the product delivery pipe from being raised in the vertical plane.

In another embodiment, a locking unit for a loading arm may include a support arm pivotally coupled at a first end to a support plate. A rocker assembly may be slidably coupled to the support arm, the rocker assembly comprising a locking pawl selectively biased into engagement with at least one slot of the support arm thereby inhibiting relative motion between the rocker assembly and the support arm. A lock release mechanism may be coupled to the locking pawl such that the lock release mechanism selectively engages and disengages the locking pawl with the support arm.

In yet another embodiment, a loading arm may include a product delivery pipe pivotally coupled to a product standpipe such that the product delivery pipe is pivotable with respect to the product standpipe in at least a vertical plane. A support arm may be pivotally connected to the product standpipe and may include a plurality of slots. A rocker assembly may be coupled to the product delivery pipe and slidably coupled to the rocker assembly such that the rocker assembly and the support arm are slidable with respect to one another. The rocker assembly may include a locking pawl selectively biased into engagement with at least one slot of the support arm thereby inhibiting relative motion between the rocker assembly and the support arm such that, when the locking pawl is engaged with slots of the support arm, the locking pawl couples the support arm to the rocker assembly thereby inhibiting rotation of the product delivery pipe with respect to the product standpipe. A lock release mechanism may be coupled to the locking pawl with a release cable, the lock release mechanism engaging and disengaging the locking pawl from the support arm.

In yet another embodiment, a lock down unit kit may include component parts capable of being retrofitted to a loading arm comprising a product delivery pipe coupled to a product standpipe with a vertical swivel such that the product delivery pipe is rotatable in at least a vertical plane. The lock down unit kit may include a rocker assembly adapted to be pivotally coupled to the product delivery pipe. The lock down unit kit may also include a support arm adapted to be slidably coupled to the rocker assembly such that the rocker assembly and support arm are slidable with respect to one another. The support arm may include a plurality of slots. The lock down unit kit may also include a locking pawl adapted to be coupled to the rocker assembly such that the locking pawl is selectively engagable with a slot of the support arm. The lock down unit kit may also include a lock release mechanism adapted to selectively disengage the locking pawl from the support arm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
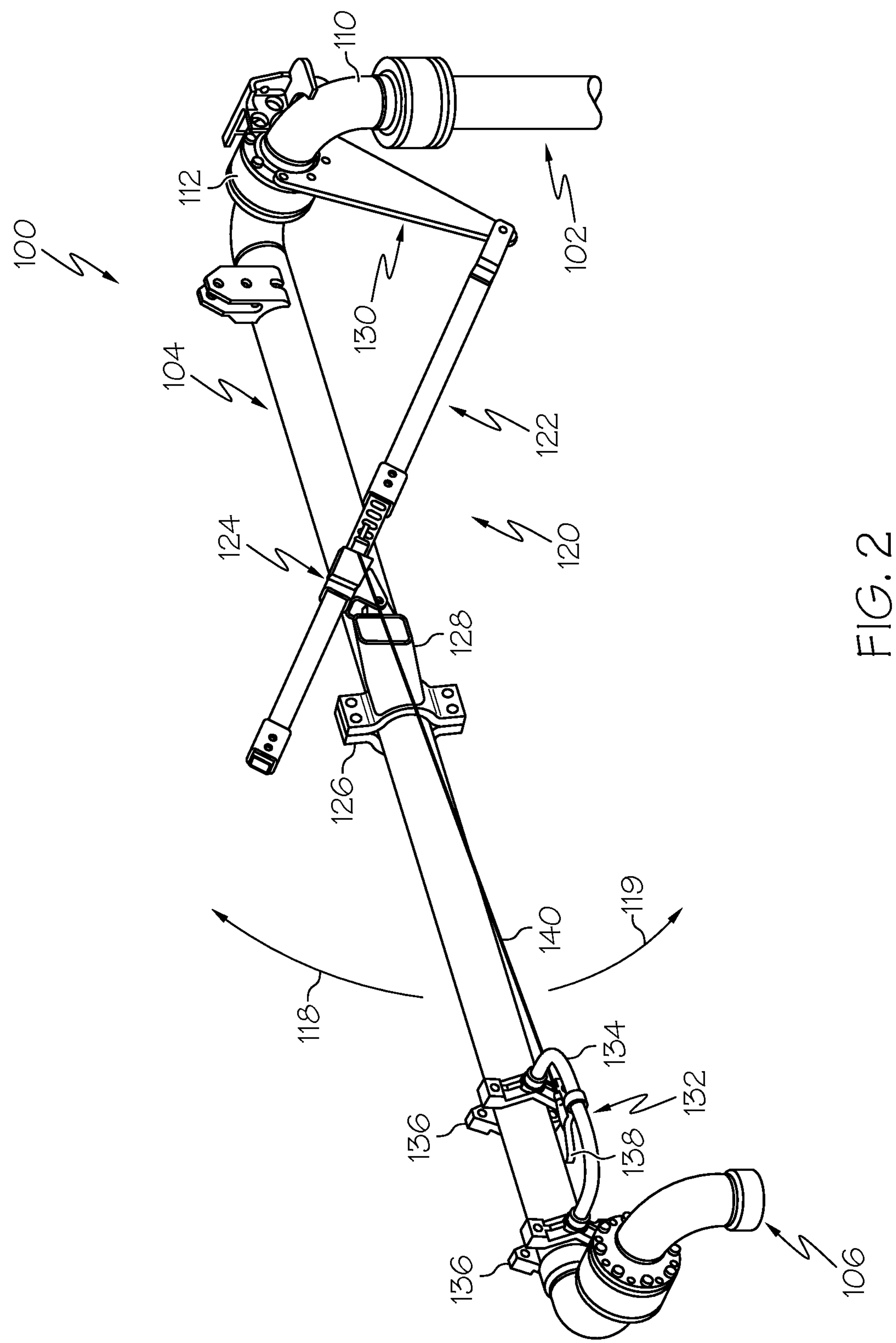
FIG. 2 schematically depicts a loading arm with a lock down unit for preventing the loading arm from being raised in the vertical plane, according to one or more embodiments shown and described herein.

Reference will now be made in detail to embodiments of lock down units and loading arms with lock down units, examples of which are illustrated in the accompanying drawings. Whenever possible, the same reference numerals will be used throughout the drawings to refer to the same or like parts. FIG. 2 generally depicts one embodiment of a loading arm with a lock down unit according to one or more embodiments shown and described herein. The loading arm generally includes a product delivery pipe pivotally coupled to a product standpipe such that the product delivery pipe is rotatable with respect to the product standpipe in at least a vertical plane. A rocker assembly may be coupled to the product delivery pipe. A support arm may be pivotally connected to the product standpipe and slidably coupled to the rocker assembly such that the support arm and the rocker assembly may be slidable with respect to one another. The support arm may include a plurality of slots. A locking pawl may be affixed to the rocker assembly and selectively engagable with one of the plurality of slots in the support arm such that, when the locking pawl is engaged with a slot of the support arm, the locking pawl couples the support arm to the rocker assembly, thereby preventing the product delivery pipe from being raised in the vertical plane. Various embodiments of lock down units and loading arms comprising the lock down units will be described in more detail herein with specific reference to the appended drawings.

Figure 1:
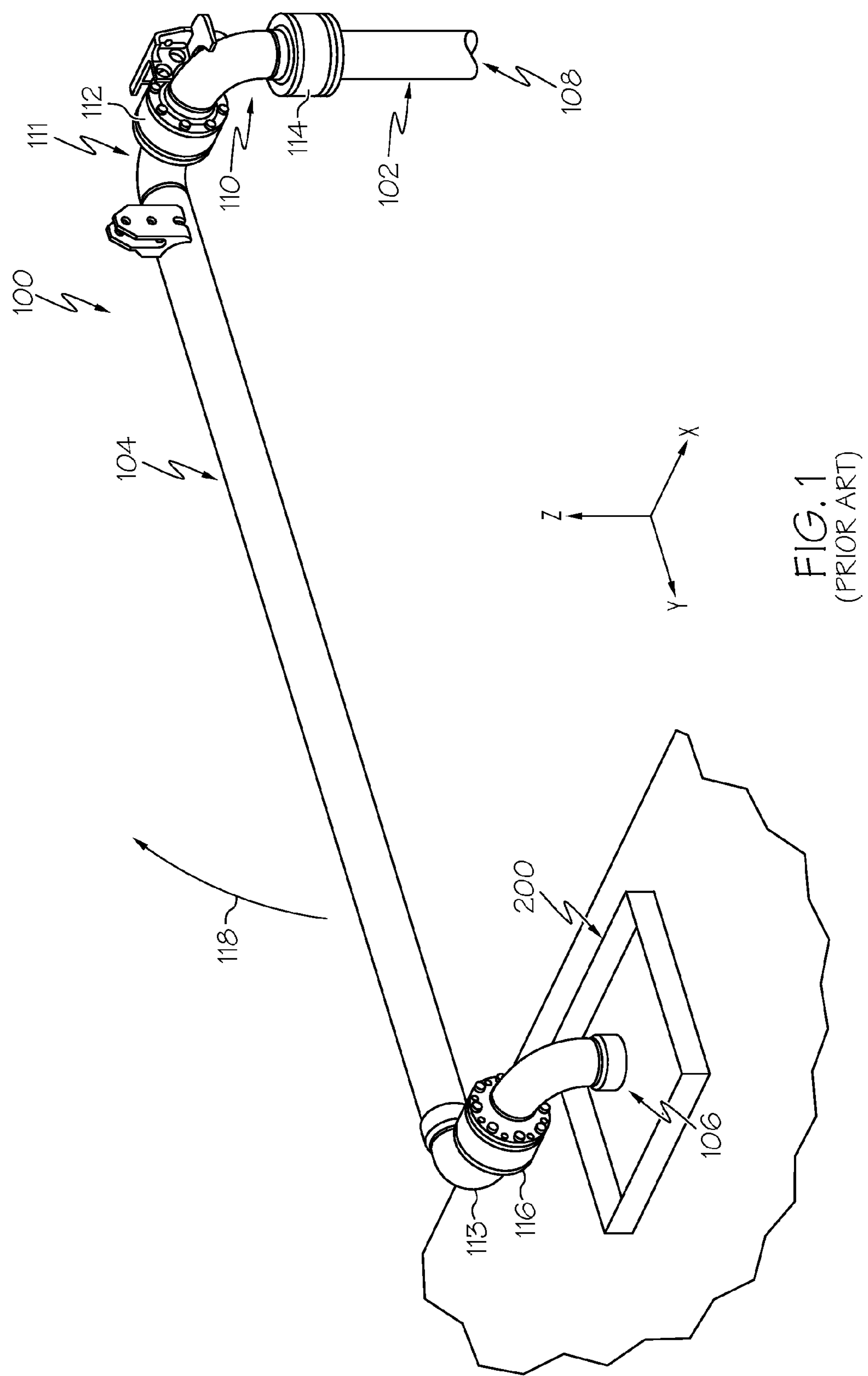
FIG. 1 schematically depicts a conventional loading arm for delivering bulk product.

Referring now to FIG. 1, a loading arm 100 for delivering bulk product is schematically depicted. The loading arm 100 generally comprises a product standpipe 102 which is coupled to a product delivery pipe 104 such that bulk product introduced into an inlet 108 of the product standpipe 102 is directed through the product standpipe 102 to the product delivery pipe 104. The product standpipe 102 is generally fixed in place (i.e., the product standpipe does not swivel with respect to the product delivery pipe). In the embodiments of the loading arm 100 described herein, the product standpipe 102 is coupled to the product delivery pipe 104 with a vertical swivel 112. The vertical swivel 112 allows the product delivery pipe 104 to swivel in the vertical plane (i.e., the y-z plane of the coordinate axes depicted in FIG. 1). This allows the product outlet 106 of the product delivery pipe 104 to be vertically positioned with respect to the loading hatch 200 of a storage tank. The vertical swivel 112 may comprise a 3000 Series Swivel Joint or an 8000 Series Swivel Joint, both of which are manufactured by OPW Engineered Systems of Lebanon, Ohio. However, it should be understood that other swivel designs may be used for the vertical swivel 112.

In the embodiment of the loading arm 100 depicted in FIG. 1, the vertical swivel 112 is fluidly coupled to the product standpipe 102 with elbow segment 110 which redirects bulk product traveling through the product standpipe 102 into the vertical swivel 112. Similarly, the vertical swivel 112 may be fluidly coupled to the product delivery pipe 104 with elbow segment 111 which redirects bulk product traveling through the vertical swivel 112 into the product delivery pipe 104.

In the embodiments described herein, the loading arm 100 may optionally include a horizontal swivel 114. The horizontal swivel 114 allows the product delivery pipe 104 to swivel in the horizontal plane (i.e., the y-x plane of the coordinate axes depicted in FIG. 1). This allows the product outlet 106 of the product delivery pipe 104 to be horizontally positioned with respect to the loading hatch 200 of the storage tank. The horizontal swivel 114 may comprise a 3000 Series Swivel Joint or an 8000 Series Swivel Joint, both of which are manufactured by OPW Engineered Systems of Lebanon, Ohio. However, it should be understood that other swivel designs may be used for the horizontal swivel 114. In the embodiments described herein, the horizontal swivel 114 is coupled to the product standpipe 102 and the elbow segment 110 such that fluid flowing out of the product standpipe 102 is directed through the horizontal swivel 114 and into the elbow segment 110.

While the loading arm 100 is depicted in FIG. 1 as including a horizontal swivel 114, it should be understood that the horizontal swivel 114 is optional and that, in some embodiments, the loading arm 100 may be constructed without the horizontal swivel 114.

Still referring to FIG. 1, in some embodiments, the loading arm 100 may optionally include a secondary vertical swivel 116. The secondary vertical swivel 116 allows the product outlet 106 to swivel in the vertical plane with respect to the loading arm 100. This allows the product outlet 106 to remain substantially vertically oriented (i.e., oriented with the z-direction of the coordinate axes depicted in FIG. 1) as the product delivery pipe 104 is rotated in the vertical plane with respect to the product standpipe 102. The secondary vertical swivel 116 may comprise a 3000 Series Swivel Joint or an 8000 Series Swivel Joint, both of which are manufactured by OPW Engineered Systems of Lebanon, Ohio. However, it should be understood that other swivel designs may be used for the secondary vertical swivel 116. In the embodiment of the loading arm 100 depicted in FIG. 1, the secondary vertical swivel 116 is fluidly coupled to the product delivery pipe 104 with elbow segment 113 such that bulk product traveling through the product delivery pipe 104 is directed through the elbow segment 113, through the secondary vertical swivel 116, and into the product outlet 106.

While the loading arm 100 is depicted in FIG. 1 as including a secondary vertical swivel 116, it should be understood that the secondary vertical swivel 116 is optional and that, in some embodiments, the loading arm 100 may be constructed without the secondary vertical swivel 116.

A typical problem with loading arms 100 of this construction is the misalignment of the product outlet 106 with the loading hatch 200 during loading. Specifically, bulk product traveling through the loading arm 100 and exiting from the product outlet 106 may do so with sufficient speed and force such that the product acts as a fluid jet which reacts against the product delivery pipe 104, causing the product delivery pipe 104 to rotate in the vertical plane in the direction indicated by arrow 118. In some situations, the bulk product may exit from the product outlet 106 at a velocity sufficient to rotate the product delivery pipe 104 completely out of alignment with the loading hatch 200, thereby causing a product spill. The lock down units and loading arms with lock down units described herein prevent the loading arm from swiveling out of alignment with the loading hatch as product is delivered through the loading arm.

Referring now to FIG. 2, a loading arm 100 with a lock down unit 120 is schematically depicted. The lock down unit generally comprises a rocker assembly 124 pivotally coupled to the product delivery pipe 104 and a support arm 122 pivotally coupled to the loading arm 100 proximate the product standpipe 102 and slidably engaged with the rocker assembly 124. As depicted in FIG. 2, the support arm 122 extends through and beyond the rocker assembly 124 and the support arm 122 and the rocker assembly 124 extend in a linear direction. The rocker assembly 124 includes a locking pawl 160 (FIG. 5) which engages with at least one slot 146 (FIGS. 3 and 6) formed in the support arm 122. As depicted in FIG. 2, in embodiments, the at least one slot 146 includes a plurality of slots that extend along the support arm 122 in the linear direction. The locking pawl is shaped such that, when the locking pawl is engaged with a slot of the support arm 122, the product delivery pipe 104 is prevented from rotating upwards in the vertical plane (i.e., in the direction indicated by arrow 118). In some embodiments, the locking pawl may be shaped such that the locking pawl "slips" or advances from slot to slot thereby allowing the product delivery pipe 104 to rotate downwards in the vertical plane (i.e., in the direction indicated by arrow 119) under its own weight until the product delivery pipe 104 reaches a predetermined position while simultaneously preventing the product delivery pipe 104 from rotating upwards in the vertical plane.

Referring now to FIGS. 2-5, the rocker assembly 124 of the lock down unit 120 is pivotally coupled to the product delivery pipe 104 between the vertical swivel 112 and the product outlet 106. In the embodiment of the lock down unit 120 depicted in FIGS. 2 and 3, the rocker assembly 124 is pivotally coupled to the product delivery pipe 104 with a mounting collar 126. The mounting collar 126 is affixed to the product delivery pipe 104 and includes a standoff bracket 128 which extends radially outward from the product delivery pipe 104. The outer end of the mounting collar 126 includes a pivot point 151 to which a yoke of the rocker assembly 124 is pivotally coupled such that the rocker assembly 124 is spaced apart from the product delivery pipe 104 and the rocker assembly is pivotable with respect to the product delivery pipe 104.

Figure 4:
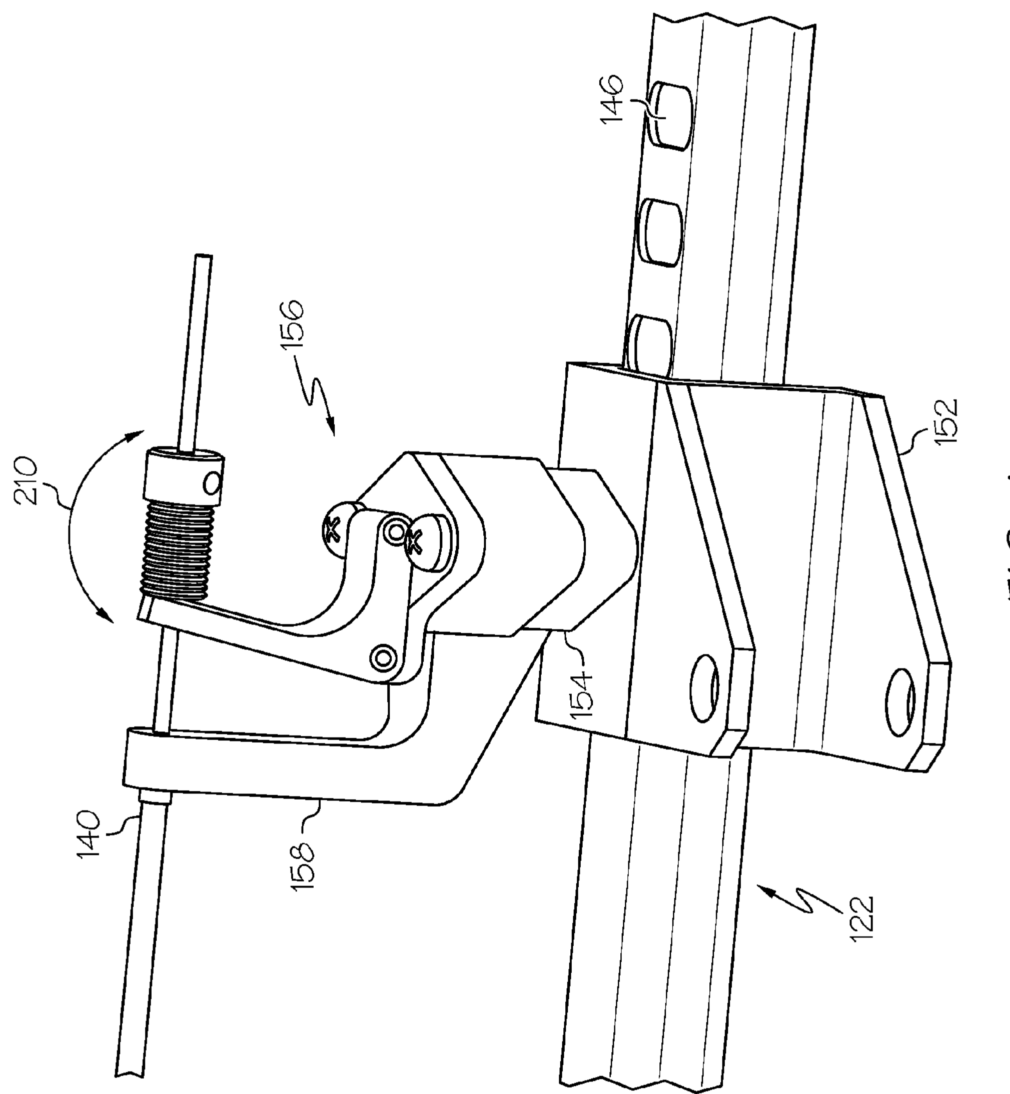
FIG. 4 schematically depicts a rocker assembly of a lock down unit according to one or more embodiments shown and described herein.

Referring specifically to FIG. 4, in the embodiments described herein, the rocker assembly 124 comprises a rocker body 154 and a plunger assembly 156. The rocker body 154 is generally hollow structure having a cross section which is complimentary to the cross section of the support arm 122 such that the rocker body is capable of receiving the support arm 122 and the support arm 122 and rocker body 154 can slide relative to one another. For example, in the embodiment of the rocker assembly 124 depicted in FIG. 4, the rocker body 154 has a substantially rectangular cross section such that the rocker body 154 is capable of receiving a support arm with a substantially rectangular cross section.

The rocker assembly 124 further comprises a yoke 152 such that the rocker assembly 124 may be pivotally coupled to the product delivery pipe 104 with the mounting collar 126. In the embodiment of the rocker assembly 124 shown in FIG. 4, the yoke 152 is coupled to the rocker body 154. In some embodiments, the yoke 152 may be integrally formed with the rocker body 154 or, alternatively, attached to the rocker body 154 such as by welding and/or mechanical fasteners (i.e., nuts and bolts, screws, rivets, or the like). In the embodiment depicted in FIG. 4, the yoke 152 comprises a pair of lobe structures spaced apart from one another such that the pivot point 151 of the standoff bracket 128 may be received between the lobes and pivotally coupled to the lobes. However, it should be understood that the yoke 152 may have other configurations. For example, in some embodiments, the yoke 152 may have a single lobe or more than two lobes.

Figure 5:
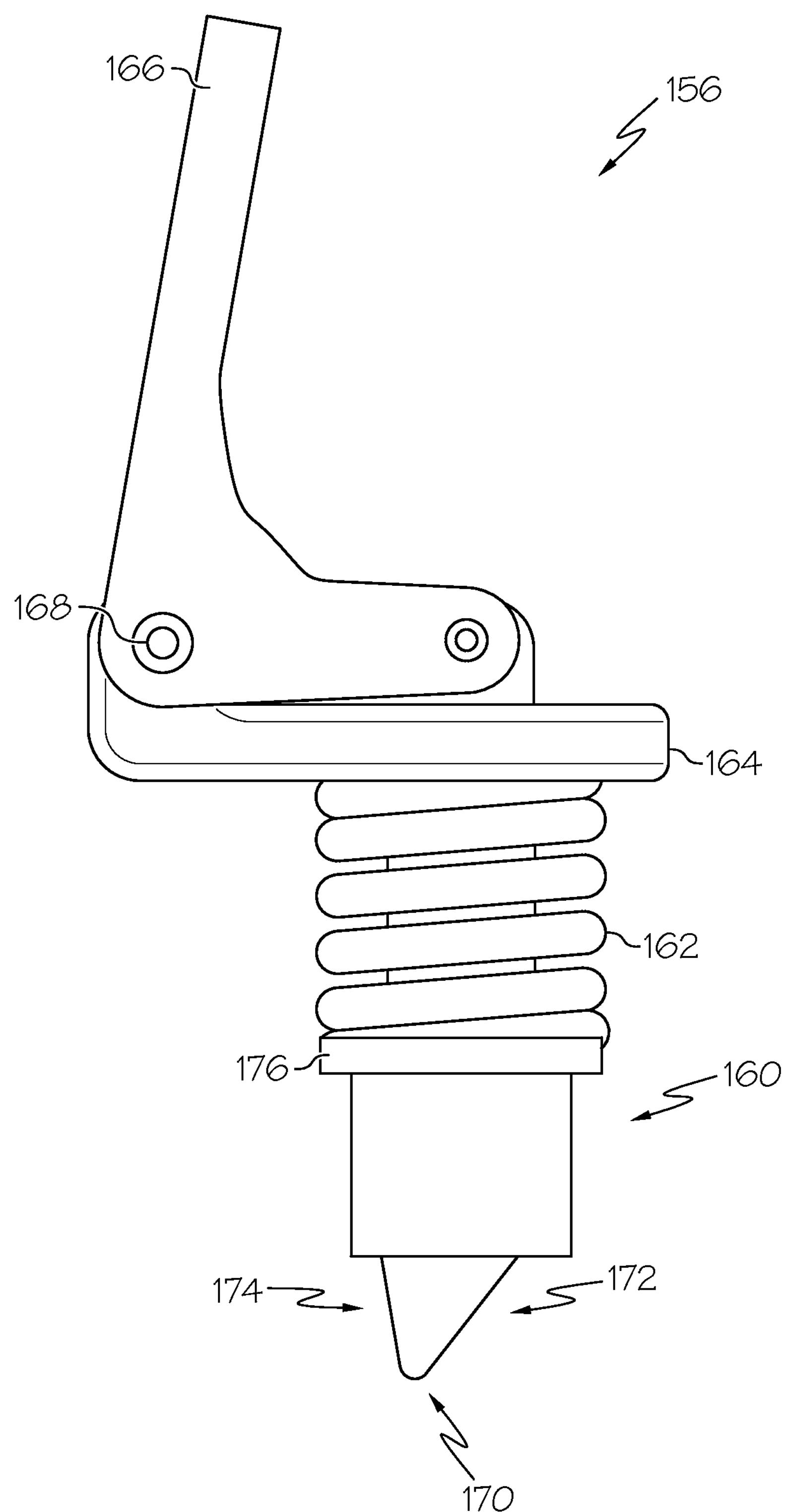
FIG. 5 schematically depicts a plunger assembly of a lock down unit according to one or more embodiments shown and described herein.
Figure 6:
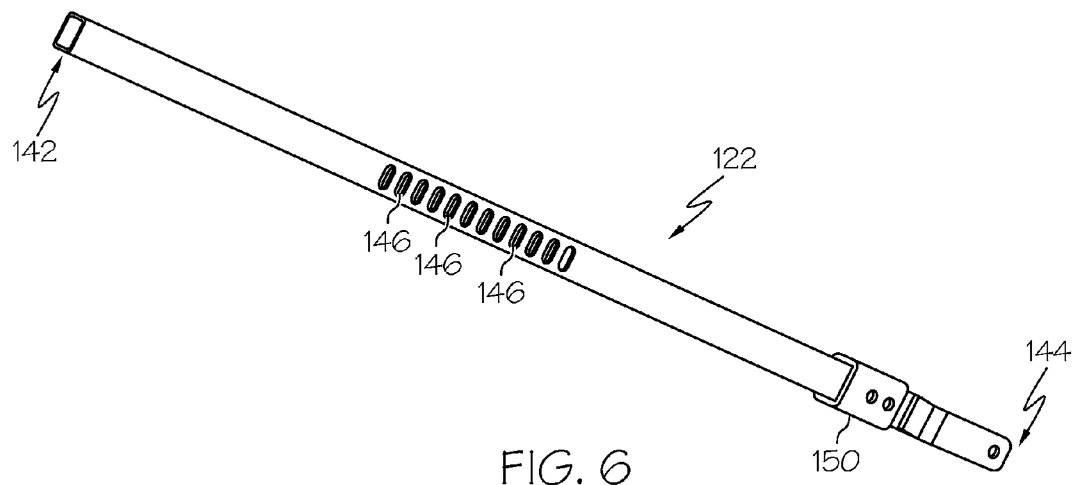
FIG. 6 schematically depicts a support arm of a lock down unit according to one or more embodiments shown and described herein.

Referring now to FIGS. 4 and 5, the rocker assembly 124 also includes a plunger assembly 156 affixed to the rocker body 154. The plunger assembly 156 generally comprises a plunger base 164, a plunger lever 166, and a locking pawl 160. The plunger base 164 is fixedly attached to the rocker body 154, such as by welding and/or mechanical fasteners. The plunger lever 166 is pivotally coupled to the plunger base 164 such that the plunger lever is free to rotate with respect to the pivot body in the directions indicated by arrow 210. In the embodiment of the plunger assembly 156 depicted in FIGS. 4 and 5 the plunger lever 166 generally has an L-shaped configuration with the locking pawl 160 coupled to the horizontal portion of the L and the release cable 140 connected to the vertical portion of the L. However, it should be understood that other configurations of the plunger lever 166 are contemplated including, for example, a plunger lever which is substantially linear. In the embodiment of the plunger assembly 156 schematically depicted in FIGS. 4 and 5, the plunger lever 166 is pivotally coupled to the plunger base with pivot pin 168. The locking pawl 160 is coupled to the plunger lever 166 and extends through an aperture (not shown) in the plunger base 164 and through a corresponding aperture (not shown) in the rocker body 154 such that the locking pawl is capable of selective engagement with the slots 146 formed in the support arm 122. In the embodiment of the plunger assembly 156 schematically depicted in FIG. 5, the locking pawl 160 is coupled to the plunger lever 166 by a roll pin to allow the plunger lever 166 to pivot with respect to the rocker body 154. However, in other embodiments, the plunger lever 166 and the locking pawl 160 maybe coupled by welding and/or mechanical fasteners such that the locking pawl 160 is rigidly affixed to the plunger lever 166.

A compression spring 162 is positioned around the locking pawl 160 such that the compression spring 162 biases the locking pawl 160 away from both the plunger base 164 and the plunger lever 166. In the embodiments described herein, the locking pawl 160 includes a retention flange 176 which extends around the diameter of the locking pawl 160. The compression spring 162 is seated on the retention flange 176 and extends between the retention flange 176 and the plunger base 164 thereby biasing the locking pawl 160 away from the plunger base 164 and the plunger lever 166.

In the embodiment of the plunger assembly 156 shown in FIG. 4, the locking pawl 160 includes a tip portion 170 which tapers to a point. For example, in at least one embodiment, a profile of the tip portion 170 is a right triangle. In this embodiment, the hypotenuse of the right triangle corresponds to the outlet face 174 of the locking pawl 160 and one of the sides of the right triangle corresponds to the inlet face 172 of the locking pawl. This embodiment of the locking pawl 160 permits the product delivery pipe 104 of the loading arm from being raised in the vertical plane when the locking pawl 160 is engaged with a slot 146 of the support arm 122 while permitting the product delivery pipe to be lowered in the vertical plane to a predetermined position even when the locking pawl 160 is engaged with a slot 146 of the support arm 122.

In an alternative embodiment (not shown), the locking pawl 160 may have a substantially rectangular or square profile. In these embodiments, when the locking pawl 160 is engaged with a slot 146 of the support arm 122, the locking pawl 160 prevents the product delivery pipe 104 from being raised and lowered in the vertical plane when the locking pawl 160 is engaged with the support arm 122.

Still referring to FIGS. 4 and 5, the position of the locking pawl 160 (i.e., engaged with a slot 146 in the support arm 122 or disengaged from a slot in the support arm 122) is achieved by rotating the plunger lever 166 with respect to the plunger base 164. Specifically, rotating the plunger lever 166 towards the plunger base 164 decompresses the compression spring thereby engaging the locking pawl 160 with the support arm 122 while rotating the plunger lever 166 away from the plunger base 164 compresses the compression spring thereby disengaging the locking pawl from the support arm 122. In the embodiments of the lock down unit 120 described herein, actuation (i.e., disengagement) of the locking pawl 160 is accomplished with a release cable 140 coupled to the plunger lever 166. In the embodiment of the plunger assembly 156 depicted in FIGS. 4 and 5 the plunger assembly 156 further inlcudes a cable mounting bracket 158. The cable mounting bracket is positioned between the plunger assembly 156 and the rocker body 154 and has a substantially L-shaped configuration to faciltate aligning the release cable 140 with the plunger lever 166 which aids in actuating the plunger lever 166. In this embodiment, the locking pawl 160 is disengaged from the support arm 122 when the release cable 140 is tensioned and the locking pawl 160 is engaged with the support arm 122 when the release cable 140 is slack. Tensioning of the release cable may be facilitated with the lock actuation mechanism, as will be described in more detail herein.

Figure 3:
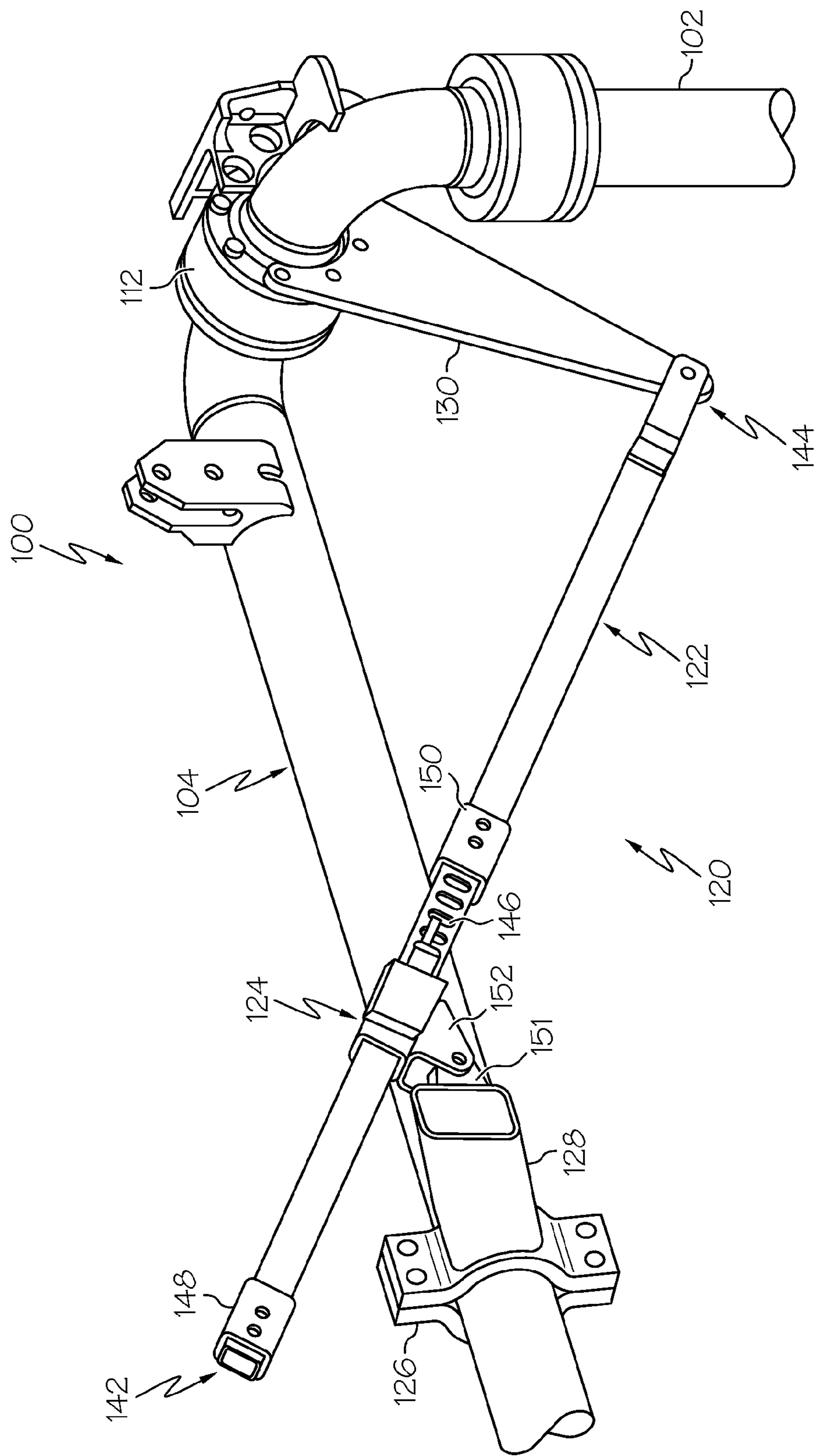
FIG. 3 schematically depicts a portion of the loading arm of FIG. 2, according to one or more embodiments shown and described herein.

Referring again to FIGS. 2-3 and 6, the lock down unit 120 further comprises a support arm 122, as briefly described above. The support arm 122 generally extends between a first end 142 and a second end 144 and comprises a plurality of slots 146 formed in the surface of the support arm 122. In the embodiments of the support arm 122 shown and described herein, the support arm 122 is substantially rectangular in cross section. However, it should be understood that other cross sectional configurations of the support arm are contemplated including, without limitation, circular, square, or even triangular cross sections. The support arm 122 is pivotally coupled to the loading arm 100 and slidably engaged with the rocker assembly 124 such that the support arm 122 and the rocker assembly 124 work in conjunction with one another to prevent the product delivery pipe 104 from being raised in the vertical plane when the locking pawl 160 is engaged with the support arm 122. More specifically, the second end 144 of the support arm 122 is pivotally coupled to the loading arm 100 proximate to the product standpipe 102. For example, in the embodiment of the loading arm 100 schematically depicted in FIGS. 2 and 3, the support arm 122 is pivotally coupled to the loading arm 100 proximate the product standpipe 102 with support bracket 130. In this embodiment, support bracket 130 is fixedly attached to the vertical swivel 112 at a first end of the support bracket 130 and the support arm 122 is pivotally coupled to the support bracket 130 at a second end of the support bracket 130. While FIGS. 2 and 3 schematically depict the support bracket 130 being coupled to the vertical swivel 112, it should be understood that the support bracket 130 may, in the alternative, be coupled to the elbow segment 110 or the product standpipe 102. Moreover, while FIGS. 2 and 3 schematically depict the support arm 122 pivotally coupled to the loading arm 100 with the support bracket 130, it should be understood that the support bracket 130 is optional and that, in some embodiments, the second end 144 of the support arm 122 may be directly coupled to the loading arm 100 without use of the support bracket 130.

The support arm 122 is slidably engaged with the rocker body 154 such that the support arm 122 and the rocker body 154 are slidable with respect to one another and the locking pawl 160 of the rocker assembly 124 may be engaged with the slots 146 of the support arm 122 (see, e.g., FIG. 4). In the embodiments described herein, the support arm 122 may further comprise at least one bumper stop. In the embodiment of the loading arm 100 depicted in FIGS. 2 and 3, the support arm 122 comprises an upper bumper stop 148 slidably positioned between the rocker assembly 124 and the first end 142 of the support arm 122 and a lower bumper stop 150 slidably positioned between the rocker assembly 124 and the second end 144 of the support arm 122. The bumper stops 148, 150 are slidable on the support arm 122 and may be fixed in place on the support arm with a mechanical fastener, such as a screw and/or bolt. As depicted in FIG. 3, the rocker assembly 124 may be positioned between the upper bumper stop 148 and the lower bumper stop 150 on the support arm 122. The bumper stops 148, 150 may be utilized to limit the range of motion of the product delivery pipe 104 in the vertical plane. Specifically, the position of the lower bumper stop 150 on the support arm 122 impedes the motion of the rocker assembly 124 on the support arm 122 as the product delivery pipe 104 rotates downward in the vertical plane (i.e., in the direction of arrow 119) thereby limiting the downward motion of the product delivery pipe 104. Similarly, the position of the upper bumper stop 148 on the support arm 122 impedes the motion of the rocker assembly 124 on the support arm 122 as the product delivery pipe 104 rotates upward in the vertical plane (i.e., in the direction of arrow 118) thereby limiting the upward motion of the product delivery pipe 104. Accordingly, it should be understood that adjusting the position of the upper bumper stop 148 and the lower bumper stop 150 on the support arm 122 limits the range of travel of the rocker assembly 124 on the support arm 122 which, in turn, limits the range of travel of the product delivery pipe 104 in the vertical plane.

Figure 8:
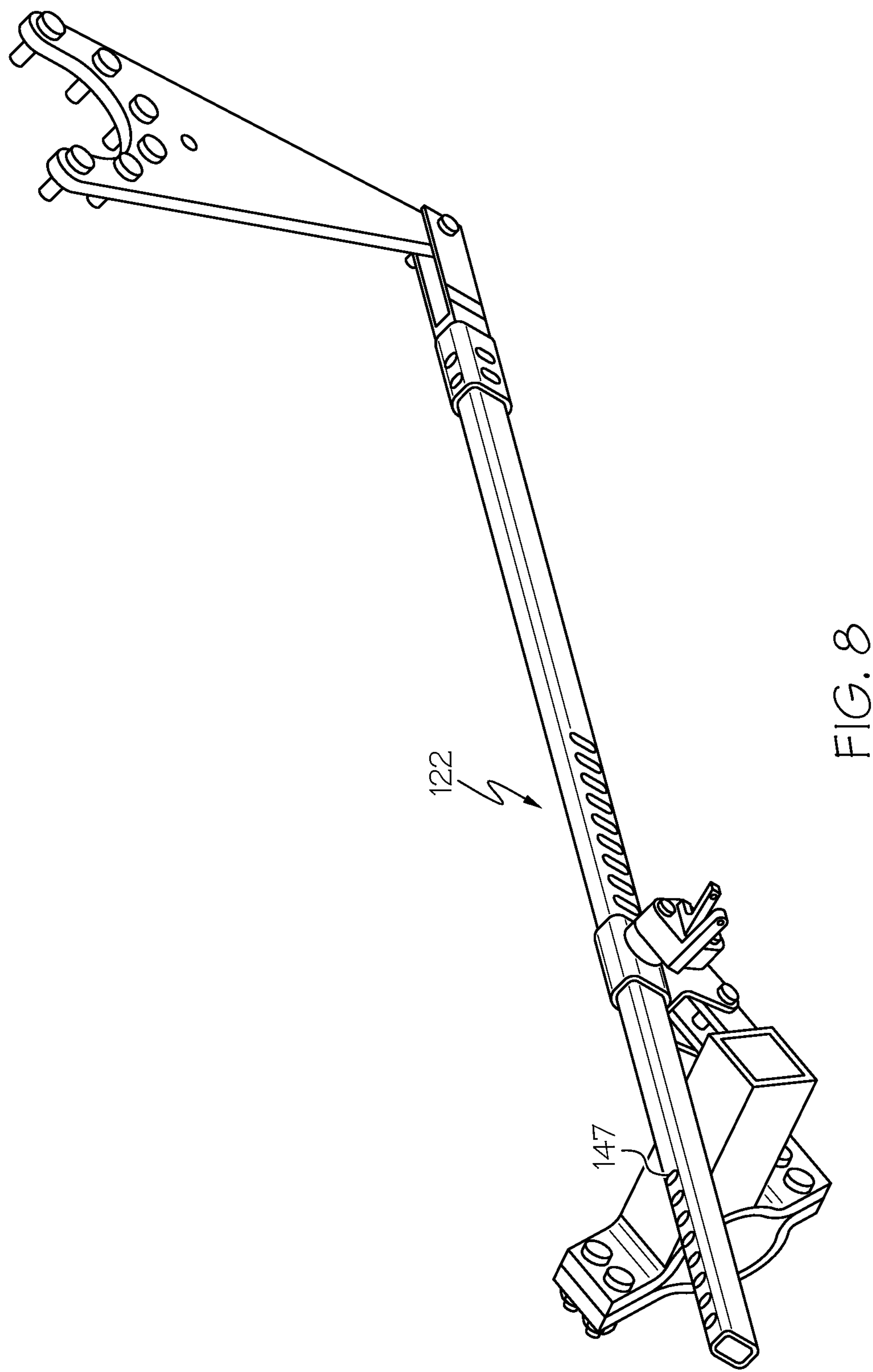
FIG. 8 schematically depicts an alternative embodiment of a support arm of a lock down unit comprising additional slots for receiving a manual locking pin.
Figure 9:
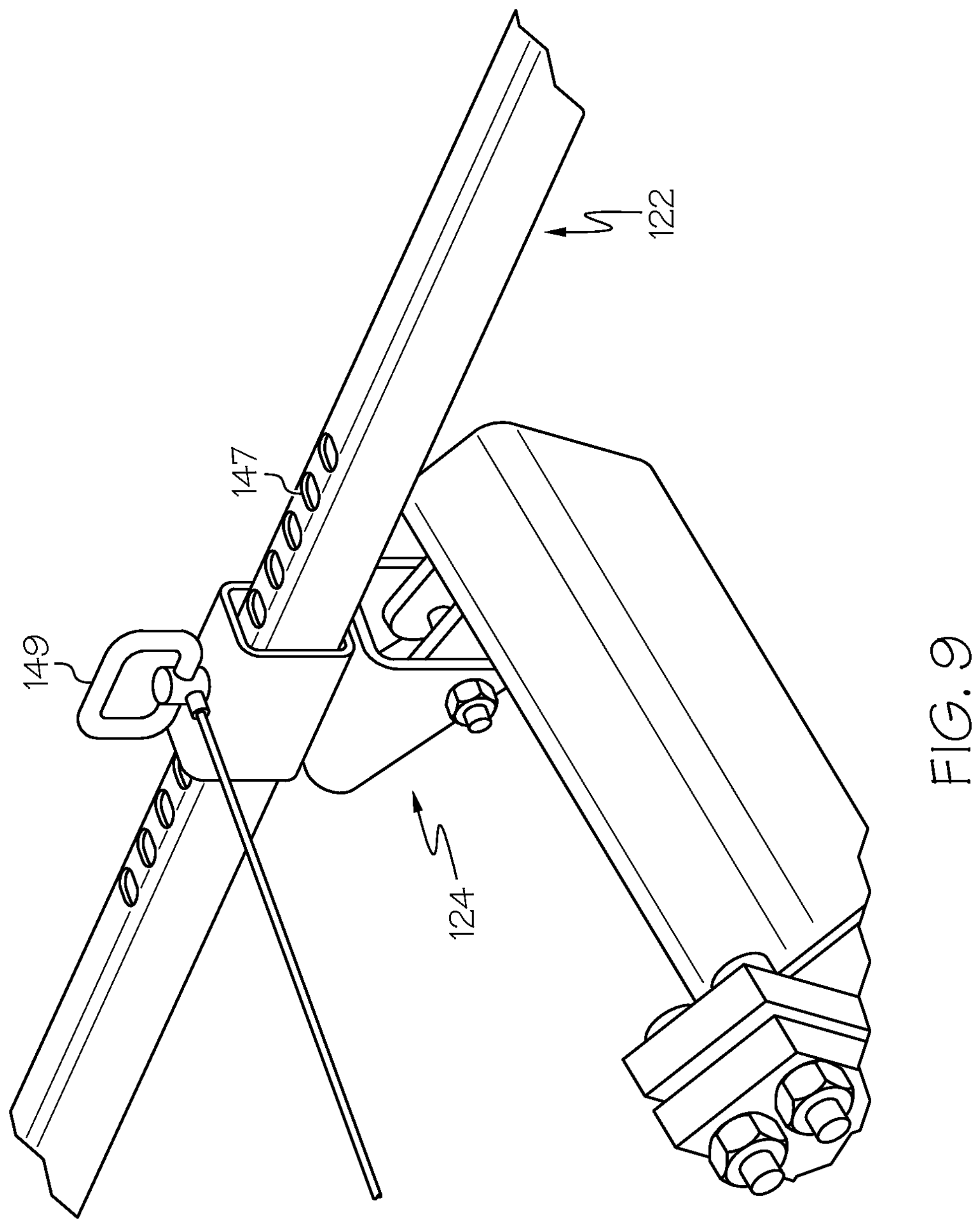
FIG. 9 schematically depicts a manual locking pin engage with the support arm of FIG. 8.

An alternative embodiment of the support arm is schematically depicted in FIG. 8. In this embodiment, the support arm further includes a second plurality of slots 147 for receiving a manual locking pin 149 which couples the support arm to the rocker assembly, as shown in FIG. 9, thereby preventing the product delivery pipe from being raised or lowered in the vertical plane.

Figure 7:
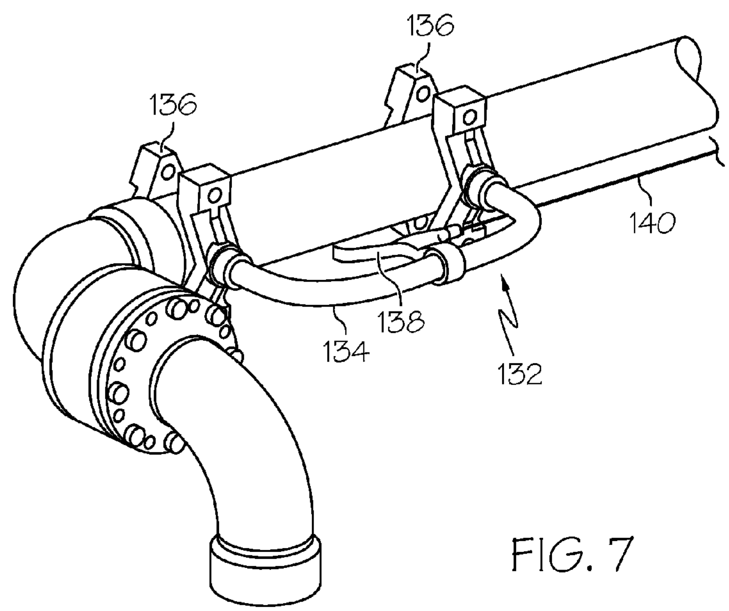
FIG. 7 schematically depicts a portion of the loading arm of FIG. 2, according to one or more embodiments shown and described herein.

Referring now to FIGS. 2 and 7, in some embodiments, the lock down unit further comprises a handle assembly 132. The handle assembly 132 is positioned on the product delivery pipe 104 between the rocker assembly and the product outlet 106. The handle assembly 132 permits a user to maneuver the product delivery pipe 104 both vertically and horizontally such that the product outlet 106 may be positioned relative to a loading hatch 200. In the embodiments described herein, the handle assembly 132 includes a handle 134 coupled to the product delivery pipe 104 with at least one mounting collar 136. Alternatively, the handle 134 of the handle assembly 132 may be directly coupled to the product delivery pipe 104, such as by welding and/or mechanical fasteners.

In some embodiments described herein, the lock down unit further comprises a lock release mechanism 138 coupled to the product delivery pipe 104. The lock release mechanism 138 actuates the plunger assembly 156 attached to the rocker assembly 124 and disengages the locking pawl 160 from the support arm 122, thereby permitting the loading arm 100 to be raised in the vertical plane. In the embodiments described herein, the lock release mechanism 138 comprises a release lever pivotally coupled to the handle 134 of the handle assembly. The lock release mechanism 138 is coupled to the plunger assembly 156 of the rocker assembly 124 with release cable 140.

Referring now to FIGS. 2, 4, 5 and 7, the lock release mechanism 138 has a neutral position wherein the release lever is rotated away from the handle 134 as shown in FIG. 7, and a release position wherein the release lever is rotated towards the handle 134. When the release lever is in the neutral position, the tension in the release cable 140 is low (i.e., the release cable 140 is slack) and the locking pawl 160 remains engaged with the support arm 122. However, when the release lever of the lock release mechanism 138 is pivoted towards the handle 134, such as when an operator actuates the release lever, the lock release mechanism 138 tensions the release cable 140. In turn, the tensioned release cable 140 pivots the plunger lever 166 about the pivot pin 168. Pivoting the plunger lever 166 compresses the compression spring 162 and disengages the locking pawl 160 from the support arm 122.

Referring now to FIGS. 2-5, in operation, the product delivery pipe 104 of the loading arm 100 is maneuvered into position over the loading hatch with the handle assembly 132. In embodiments of the lock down unit 120 which include a locking pawl 160 with a right angle profile, as described above, the product delivery pipe 104 may be lowered in the vertical plane without disengaging the locking pawl 160 from the support arm 122 with the lock release mechanism 138. However, in embodiments in which the lock down unit 120 includes a locking pawl 160 with a square or rectangular profile, as described above, lowering the product delivery pipe in the vertical plane may necessitate disengaging the locking pawl 160 from the support arm 122 with the lock release mechanism 138.

Once the product delivery pipe 104 is properly positioned over the loading hatch, bulk product is directed into the product standpipe 102, through the product delivery pipe 104, exiting out of the product outlet 106. As the bulk product exits the product outlet 106, the product reacts against the product delivery pipe 104, urging the product delivery pipe 104 to rotate upwards, in the direction indicated by arrow 118. However, because the locking pawl 160 is engaged with the slots 146 in the support arm 122, the interaction between the locking pawl 160 and the support arm 122 prevents the product delivery pipe 104 from rotating upwards in the direction indicated by arrow 118, thereby preventing misalignment of the product outlet 106 with the loading hatch and preventing product spills.

After loading is completed, the product outlet 106 may be disengaged from the loading hatch by rotating the product delivery pipe 104 upwards, in the direction of arrow 118. This is accomplished by actuating the lock release mechanism 138 which, in turn, tensions the release cable 140, thereby disengaging the locking pawl 160 from the support arm 122. With the lock release mechanism actuated, the product delivery pipe 104 may be rotated upwards, in the direction indicated by arrow 118, thereby disengaging the product outlet 106 from the loading hatch. As the product delivery pipe 104 is rotated upwards, the rocker assembly 124 slides on the support arm 122 towards the second end of the support arm. The position of lower bumper stop 150 on the support arm 122 dictates the range of travel of the rocker assembly 124 on the support arm 122 and, as such, the amount of rotation that may be imparted to the product delivery pipe 104.

When the product loading arm has been raised, the lock release mechanism may be de-actuated, thereby reengaging the locking pawl 160 with the support arm 122. In embodiments of the lock down unit 120 which include a locking pawl 160 with a right angle profile, as described above, the right angle profile of the locking pawl 160 allows the locking pawl 160 to slip between slots 146 on the support arm 122 despite the locking pawl 160 being engaged with the support arm, thereby allowing the rocker assembly 124 to slide towards the first end 142 of the support arm 122 and the upper bumper stop 148 which limits the range of travel of the rocker assembly 124 on the support arm 122. As the rocker assembly 124 slides on the support arm 122, the product delivery pipe 104 is lowered in the vertical plane to a predetermined position.

It should be understood that the embodiments of the lock down unit described herein may be retrofitted to existing conventional loading arms. Accordingly, it should be understood that, in some embodiments, the lock down unit may be supplied as a kit of parts which includes the rocker assembly, the support arm, and the mating collar with stand-off bracket. Optionally, the kit of parts may include the handle assembly, the lock release mechanism, the lock release cable, and the support bracket. The individual parts of the kit of parts may be packaged together for the ultimate purpose of retrofitting a conventional loading arm with a lock down unit to prevent the loading arm from rotating upwards during product loading.

It should now be understood that the embodiments of the lock down unit described herein may be used to prevent a product delivery pipe of a loading arm from rotating upwards and out of alignment with a loading hatch during product loading, thereby preventing product spills, improving product loading efficiencies, and decreasing product costs. Embodiments of the lock down unit may be retrofitted to existing loading arms or, in the alternative, may be a component of newly manufactured loading arms.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A loading arm comprising:

a product delivery pipe pivotally coupled to a product standpipe such that the product delivery pipe is rotatable with respect to the product standpipe in at least a vertical plane;

a rocker assembly coupled to the product delivery pipe;

a support arm pivotally connected to the product standpipe and slidably coupled to the rocker assembly such that the support arm extends through and beyond the rocker assembly and the support arm and the rocker assembly are slidable with respect to one another, wherein the support arm comprises a plurality of slots; and a locking pawl affixed to the rocker assembly and selectively engagable with one of the plurality of slots in the support arm such that, when the locking pawl is engaged with one of the plurality of slots of the support arm, the locking pawl couples the support arm to the rocker assembly, thereby preventing the product delivery pipe from being raised in the vertical plane.

2. The loading arm of claim 1, further comprising:

an upper bumper stop slidably connected to the support arm at a first end of the support arm; and a lower bumper stop slidably connected to the support arm at a second end of the support arm wherein the rocker assembly is positioned between the upper bumper stop and the lower bumper stop on the support arm.

3. The loading arm of claim 2, wherein the upper bumper stop is selectively fixed to a first location along the support arm such that motion of the rocker assembly along the support arm is bounded at the first location.

4. The loading arm of claim 2, wherein the lower bumper stop is selectively fixed to a second location along the support arm such that motion of the rocker assembly along the support arm is bounded at the second location.

5. The loading arm of claim 1 further comprising:

a plunger assembly coupled to the rocker assembly, the plunger assembly comprising the locking pawl; and a lock release mechanism coupled to the plunger assembly, wherein actuation of the lock release mechanism disengages the locking pawl from the support arm.

6. The loading arm of claim 5, wherein the plunger assembly comprises a plunger base and a plunger lever, wherein:

the plunger base is affixed to a rocker body of the rocker assembly;

the plunger lever is pivotally attached to the plunger base; and the locking pawl extends through the plunger base and the rocker body and is coupled to the plunger lever, wherein rotating the plunger lever relative to the plunger base engages and disengages the locking pawl with the support arm.

7. The loading arm of claim 6, wherein the plunger assembly further comprises a compression spring biasing the locking pawl away from the plunger base.

8. The loading arm of claim 1, wherein the product delivery pipe is pivotally coupled to the product standpipe with a vertical swivel.

9. The loading arm of claim 1, wherein the support arm is pivotally coupled to a support plate at a first end of a support bracket and a second end of the support bracket is coupled to the loading arm proximate the product standpipe.

10. The loading arm of claim 1, wherein the rocker assembly is pivotally coupled to the product delivery pipe with a mounting collar, the mounting collar comprising a stand-off bracket such that the rocker assembly is spaced apart from the product delivery pipe.

11. The loading arm of claim 1, wherein the product delivery pipe is pivotally coupled to the product standpipe such that the product delivery pipe is rotatable with respect to the product standpipe in a horizontal plane.

12. A locking unit for a loading arm comprising:

a support arm pivotally coupled at a first end to a support plate;

a rocker assembly slidably coupled to the support arm such that the support arm extends through and beyond the rocker assembly, the rocker assembly comprising a locking pawl selectively biased into engagement with at least one slot of the support arm thereby inhibiting relative motion between the rocker assembly and the support arm; and a lock release mechanism coupled to the locking pawl, the lock release mechanism selectively engaging and disengaging the locking pawl with the support arm.

13. The locking unit for a loading arm of claim 12, wherein the locking pawl comprises a tip portion having a right angle profile.

14. The locking unit for a loading arm of claim 12 further comprising:

a plunger assembly coupled to the rocker assembly, the plunger assembly comprising the locking pawl, wherein the lock release mechanism is coupled to the plunger assembly such that actuation of the lock release mechanism disengages the locking pawl from the support arm.

15. The locking unit for a loading arm of claim 14, wherein the plunger assembly comprises a compression spring biasing the locking pawl into engagement with a slot of the support arm.

16. The locking unit of claim 14, wherein the plunger assembly comprises a plunger base and a plunger lever, wherein:

the plunger base is affixed to a rocker body of the rocker assembly;

the plunger lever is pivotally attached to the plunger base; and the locking pawl extends through the plunger base and the rocker body and is coupled to the plunger lever, wherein rotating the plunger lever relative to the plunger base engages and disengages the locking pawl with the support arm.

17. The loading arm of claim 16, wherein the plunger assembly further comprises a compression spring biasing the locking pawl away from the plunger base.

18. The locking unit for a loading arm of claim 12, wherein the lock release mechanism is coupled to the locking pawl with a release cable.

19. A loading arm comprising:

a product delivery pipe pivotally coupled to a product standpipe such that the product delivery pipe is pivotable with respect to the product standpipe in at least a vertical plane;

a support arm pivotally connected to the product standpipe and having a plurality of slots;

a rocker assembly coupled to the product delivery pipe and slidably coupled to the support arm such that the support arm extends through and beyond the rocker assembly and the rocker assembly and the support arm are slidable with respect to one another, the rocker assembly comprising a locking pawl selectively biased into engagement with at least one of the plurality of slots of the support arm thereby inhibiting relative motion between the rocker assembly and the support arm such that, when the locking pawl is engaged with the at least one of the plurality of slots of the support arm, the locking pawl couples the support arm to the rocker assembly thereby inhibiting rotation of the product delivery pipe with respect to the product standpipe; and a lock release mechanism coupled to the locking pawl with a release cable, the lock release mechanism engaging and disengaging the locking pawl from the support arm.

20. The loading arm of claim 19, wherein a tip portion of the locking pawl has a right angle profile.

21. The loading arm of claim 19, wherein the rocker assembly further comprises a plunger assembly comprising a compression spring biasing the locking pawl into engagement with the at least one slot of the support arm.

22. A lock down unit kit having component parts capable of being retrofitted to a loading arm comprising a product delivery pipe coupled to a product standpipe with a vertical swivel such that the product delivery pipe is rotatable in at least a vertical plane; the lock down unit kit comprising a combination of:

a rocker assembly adapted to be pivotally coupled to the product delivery pipe, wherein the rocker assembly extends in a linear direction;

a support arm adapted to be slidably coupled to the rocker assembly such that the rocker assembly and support arm are slidable with respect to one another in the linear direction, the support arm extending in the linear direction and comprising a plurality of slots that extend along the support arm in the linear direction;

a locking pawl adapted to be coupled to the rocker assembly such that the locking pawl is selectively engagable with at least one of the plurality of slots of the support arm; and a lock release mechanism adapted to selectively disengage the locking pawl from the support arm.

23. The lock down unit kit of claim 22, further comprising a lock release cable adapted to couple the lock release mechanism to the locking pawl.

24. The lock down unit kit of claim 22, further comprising a handle assembly capable of engagement with the product delivery pipe at a plurality of positions along the product delivery pipe.

* * * * *